United States Patent Office 3,492,268
Patented Jan. 27, 1970

3,492,268
POLYCARBONATES OF IMPROVED
COLOR PROPERTIES
Peter J. Baker, New Martinsville, W. Va., assignor to Mobay Chemical Company, Pittsburgh, Pa., a corporation of Delaware
No Drawing. Continuation-in-part of application Ser. No. 226,457, Sept. 26, 1962. This application Jan. 13, 1967, Ser. No. 608,983
Int. Cl. C08g 17/13
U.S. Cl. 260—47                        6 Claims

ABSTRACT OF THE DISCLOSURE

Polycarbonates having less than about 6 parts per million based on the weight of polycarbonate composition of metal contamination and a method for controlling the contamination in the polycarbonates by preparing the polycarbonate in a glass lined reactor, by adding metal-lean polycarbonate to the polycarbonate reaction product and/or by adding chelating agents.

---

This invention relates generally to polycarbonate compositions and more specifically to novel color stable polycarbonate compositions and methods for their preparation and is a continuation-in-part of application Ser. No. 226,457, filed Sept. 26, 1962, now abandoned.

In the production of a polycarbonate plastic, a problem that has caused much concern is the initial color and the color stability of the resulting molded polycarbonate product when heated. These color stability problems have been specifically noticeable in pigmented polycarbonates, but are also prevalent in the production of polycarbonates of natural color. In pigmented polycarbonates, color instability has been quite pronounced and particularly noticeable in cadmium sulfide yellow colors, somewhat less noticeable in cadmium selenide reds and somewhat less pronounced, although still present in other pigmented polycarbonates. A parallel color instability problem has also existed in the natural color resins.

Since polycarbonate polymers are used in the manufacture of molded products such as safety helmets, films, fibers and the like, any discoloration which occurs during their processing is highly objectionable. Although there have been some attempts to solve these problems, most of the solutions proposed have been of only limited use or success since the heating or molding of polycarbonate polymers has invariably resulted in severe discoloration of the product.

It is therefore an object of this invention to provide a polycarbonate composition and method for making it which is devoid of the foregoing disadvantages.

Another object of the invention is to provide a polycarbonate composition having improved color characteristics and a method for making it.

A further object of the invention is to provide a polycarbonate having improved stability and a method for preparing it.

Still another object of this invention is to provide pigmented as well as natural colored polycarbonate compositions and methods for preparing them.

The foregoing objects and others which will become apparent from the following description are accomplished in accordance with this invention, generally speaking, by providing color stable polycarbonate compositions and methods for preparing them wherein the amount of metal contamination present is controlled to a critical amount of from about 2 p.p.m. to about 6 p.p.m. based on the total weight of the polycarbonate. The discovered ability of polycarbonates to tolerate some metal contamination eliminates the necessity of using the involved and expensive procedures heretofore required to remove substantially all metallic impurities present. The metal contamination is preferably controlled by carrying out the reaction for the production of a polycarbonate in a glass lined reactor and/or adding metal-lean polycarbonate to the polycarbonate being prepared and/or using chelating agents.

This invention provides a method for the preparation of color stable polycarbonate resins which had previously been characterized by their comparatively poor color stability due to the presence of metallic contaminants such as, for example, nickel, copper and iron. In particular, it has been found that the poor color stability and inferior initial color quality of polycarbonates is due especially to the presence of nickel in the polycarbonate material in its metallic and/or salts and/or oxides forms. One preferred method for controlling the percentage of nickel in the final product to some extent is to replace the nickel or stainless steel reactors used heretofore with glass lined reactors. However, even in this process, trace amounts of nickel from other sources were detected in the finished polycarbonate product. By controlling or reducing the amount of metal contaminant to from 2–6 p.p.m. (parts per million based on the total weight of the polycarbonate), a polycarbonate having improved color properties is obtained.

Another method for controlling the metal contamination in a polycarbonate is to use chelating agents. This method is preferred because of its ease of application and efficiency. For example, although it is highly advantageous to use a glass lined reactor in the preparation of a polycarbonate to reduce the amount of metal contamination therein in accordance with this invention, it has been found that after the glass lined equipment has been used for some time, hairline cracks or breaks in the glass occur which often escape notice. Such cracks or breaks bare the metal supporting material to the reactants and reaction mixture being contained therein. As a consequence, the metal which is lined with the glass introduces some contamination into the polycarbonate being formed. This results in a very serious problem with, for example, iron contamination which causes the discoloration of the polycarbonate product. Hence, it is desirable to use a chelating agent either instead of or in addition to the glass lined reactor in such instances. Any suitable chelating agent may be used such as, for example, salts of ethylenediamine tetraacetic acid, sodium tetraphosphate, sodium gluconate, sodium citrate, di - (hydroxyethyl)glycine, (hydroxyethyl)ethylenediamine triacetic acid, diethylenetriamine pentaacetic acid, gluconic acid, tartaric acid, citric acid, saccharic acid, Versenes (compositions containing sodium salts of ethylene diamine and tetraacetic acid), phosphate salts such as, for example, sodium pyrophosphate, sodium tripolyphosphate, sodium tetrapolyphosphate, sodium phosphate glasses generally such as for example, Calgon, acetyl acetone and the like and mixtures thereof. Preferably the metal contamination is controlled with the use of such chelating agents simply by washing the polycarbonate reaction product as described in Example 4. Such simple processes easily and effectively reduce the contamination of metals in polycarbonates to less than about 6 p.p.m. in accordance with this invention.

A third preferred method of controlling the metal contamination in a polycarbonate reaction product is the addition of metal-lean polycarbonate to the material being formed. This embodiment may be used either alone or in conjunction with the use of a glass lined reactor and/or the use of a chelating agent. The amount of metal-lean polycarbonate used in such instances is totally dependent upon the concentration of the metal contamination in the polycarbonate product to be treated.

Nickel analyses were run on both the solvent and dough produced polycarbonates; these results indicated a strong correlation between the amount of nickel present and the color stability of the polycarbonate. The difference between solvent and dough produced polycarbonates is the amount of solvent used in the preparation. It was surprising to find that even though nickel might be present in either form of polycarbonate product, if the concentration is controlled and kept at from 2 p.p.m.–6 p.p.m., comparatively few color problems are encountered.

Although involved processes may be used to remove substantially all impurities, such procedures are both expensive and time consuming, and invariably result in an increase in the cost of the final product. Such products and processes are therefore commercially poor because they cannot compete costwise with other commercially available products or processes.

In the production of polycarbonates, any metal impurities present in the reaction product cause color problems both in the initial color quality and in the color stability of the finished product and there is a direct correlation between the amount of metal present and the color stability of the polycarbonate. It was thus surprising to find that certain amounts of metal contaminants can be tolerated in the final polycarbonate product and still result in a composition having excellent color properties. It is critical however that not more than 6 p.p.m. (parts per million) of the metal contaminant based on the total weight of the polycarbonate be present in the final product since, once this amount is exceeded, the resulting polycarbonate has very poor color stability and color quality. The finding of this invention provides a valuable contribution to the art in that it eliminates the necessity for complicated procedures to remove all metal present, while at the same time providing a product substantially identical to a completely metal free polycarbonate as far as color considerations are concerned. It has been found that to reduce the amount of metal contamination to below 2 p.p.m. would not improve the color characteristics or color stability of the resulting plastic to any noticeable degree. Also, to reduce the metal contamination of the polycarbonate material to below 2 p.p.m. would require time consuming and expensive procedures which would be of little moment in improving the color qualities of the final product.

The terms nickel, iron, copper, chromium and the like metallic contaminants, as used in this disclosure apply equally as well to compounds such as salts and oxides which are based on those metals. For example, it has been found that the presence of nickel chloride ($NiCl_2$) is one of the most detrimental of polycarbonate contaminants, and that only about 0.2% $NiCl_2$ (based on the total weight of the polycarbonate composition), for example, resulted in a final product having exceptionally poor color stability. NiO, while not as detrimental as $NiCl_2$, was also found to be an undesirable contaminant as far as color stability is concerned. Although the present invention will be specifically defined in terms of nickel impurities as above mentioned, other contaminating substances such as copper and iron and their salts also hinder the production of color stable polycarbonates. Some of these metal containing contaminants are nickel oxides, nickel chlorides, nickel sulfides, nickel sulfates, nickel sulfites, cupric oxide, cuprous oxide, cupric chloride, cuprous sulfide, cupric sulfide, cupric sulfate, cuprous sulfate, ferric oxide, ferrous oxide, ferric chloride, ferrous chloride, ferric sulfide, ferrous sulfide, ferric sulfate, ferrous sulfate, ferric sulfite, ferrous sulfite, chromium oxide, chromium chloride, chromium sulfide, chromium sulfate, chromium sulfite and mixtures thereof. The quantity of metal contamination present can be determined analytically by spectrographic methods or other known methods, such as given in Kolthoff and Lingane, "Polarography," vol. I, Interscience Publishers, II edition, 1952, page 377.

This invention is applicable to all types of polycarbonate compositions which may be prepared in any suitable manner. The polycarbonate composition may be produced from a dihydroxy diaryl alkane and phosgene or a diester or a carbonic acid, for example, as described in Canadian Patents 578,585; 578,795 (issued June 30, 1959); 594,805 (issued Mar. 22, 1960); U.S. Patent 3,028,365 (issued Apr. 3, 1962) and the like. Other processes which may be used in the production of carbonates which may be treated in accordance with the process of this invention include those referred to in "Polycarbonates" by William F. Christopher and Daniel W. Fox, pages 10–21 as well as those described in U.S. Patents 2,999,846; 2,970,131; 2,991,273; 2,999,835; 3,014,891, and the like.

The glass lined reactor has been of considerable assistance in controlling the percentage of nickel and/or other metal ions in the final product in accordance with the discovery of this invention that critical amounts of metal impurities can be tolerated in the final product and yet result in a product having good color stability. Various other methods may also be used in controlling the amount of nickel present in polycarbonate compositions instead of, or in addition to, the glass lined reactor. As stated hereinbefore, chelating agents and the addition of metal pure polycarbonate to the contaminated material have proven effective in controlling metal contamination either alone or in conjunction with any of the other preferred processes. Hence, when a contaminant is present in an amount exceeding 6 p.p.m. after leaving the reactor, for example, the contamination may still be controlled by such means.

When using a glass lined reactor or any of the other methods discussed herein for controlling metal contamination in polycarbonates, the average color stability of the polycarbonate produced generally improves from a sample having very poor color stability to one having good color stability; simultaneously, the natural color of the polycarbonate is improved by statistically significant amounts. The maximum level of nickel, for example, that can be tolerated in the polycarbonate and yet provide a color stable product is 6 p.p.m. nickel based on the total amount of polycarbonate although it is preferred for best results that the final product only contain from about 2–5 parts per million of the metal contaminant.

The invention is further illustrated but it not intended to be limited by the following examples in which all parts and percentages are by weight unless otherwise specified.

EXAMPLE 1

About 685 parts of 2,2-(4,4'-dihydroxy diphenyl) propane (Bisphenol A) (3 mols) and about 6.5 parts of p-t-butyl phenol are suspended in about 2640 parts of water and agitated well in a three-neck reaction flask. The three-neck flask is equipped with a gas addition tube and a drip tube for the addition of liquid. The oxygen is removed from the suspended Bisphenol A slurry by blowing nitrogen through it for about a 15-minute period. After the removal of oxygen, about 480 parts of a 50% solution of sodium hydroxide are added. The reaction flask is then cooled to about 25° C. with the application of external cooling. After the 25° C. temperature has been reached, about 1500 parts of methylene chloride are added to the reactor while agitating.

After the methylene chloride addition is completed, the introduction of phosgene is begun at such a rate that over about a 100 minute period, about 356 parts (3.6 mols) of phosgene are added while agitation is maintained. Simultaneously with the start of phosgenation, the addition of about a 50% sodium hydroxide solution is also commenced so that in about an 80 minute period, about 192 parts of sodium hydroxide solution are added to the mixture. The temperature during the phosgenation reaction is maintained at about 25° C. with the application of external cooling. At the end of the phosgenation, about 2 parts of triethylamine are added to the reaction mixture and the mixture is agitated for a period of about 20 minutes. The agitation is now stopped and the mixture is allowed to separate into two phases. The lower, heavy phase will contain the polycarbonate in the form of a solution and the top phase will contain water, unreacted sodium hydroxide and sodium chloride. The top phase is decanted and disposed of. The polymer solution is successively washed with a 1% sodium hydroxide solution and then with a 1% phosphoric acid solution, followed by water washes until the wash water is essentially free of electrolytes.

After the phosgenation is completed, the reaction mixture is discharged to a heavy duty mixer such as a Baker-Perkins sigma mixer and about 2 parts of triethylamine are added to the material in the sigma mixer. After about 30 minutes of agitation in the sigma mixer, the mixture becomes extremely viscous and forms a dough and an aqueous alkaline layer. The aqueous alkaline layer is discharged to the sewer, the dough is repeatedly washed with dilute caustic and dilute phosphoric acid and finally with several changes of distilled water until the overflow water shows essentially no electrolyte as determined by conductivity measurements. At the end of the washing, the dough breaks up into small particles which can be further processed by any desired method. This product is then divided into a plurality of equal portions.

A film cast from this polycarbonate has a relative viscosity of about 1.33–1.37 as determined at a concentration of 0.5 part of polycarbonate in about 100 parts of methylene chloride at 25° C.

The amount of nickel contained in the polycarbonate prepared by the above process is varied by causing various fixed amounts of nickel to be present in the polycarbonate resin produced. The nickel contamination is derived from the metallic reactor used and/or other components in the production system. The amount of nickel present can be adjusted by the addition of metal free polycarbonate powder and/or chelating agents. The color stability of the resulting nickel-containing compositions is then determined. The amount of nickel present in each of the compositions tested is determined by polarographic and other known analytical methods. The following table indicates various degrees of visual color deterioration upon the application of heat and indicates the corresponding value given to those examples tested:

A—exceptionally good color stability
B—good color stability
C—poor color stability
D—very poor color stability
E—exceptionally poor color stability The drop in color stability from B ratings to C ratings is extremely noticeable and the corresponding products deteriorated from a desirably commercial product (B) (from a color standpoint) to a product (C) of little if any commercial potential.

EXAMPLE 2

In the process of Example 1 various amounts of nickel or nickel containing compounds were caused to be present in the polycarbonates produced with the following results:

| Amount of contaminant, p.p.m. Ni: | Color degradation value |
|---|---|
| 50 | E |
| 40 | E |
| 25 | E |
| 17 | D |
| 10 | C–D |
| 6 | B |
| 5 | A–B |
| 3 | A–B |
| 2 | A |
| 0 | A |

EXAMPLE 3

The process of Example 1 is followed except that a glass lined reactor wherein even the reservoirs and conduits are glass lined is used instead of the nickel reactor of Example 1 and all of the reactants introduced into the glass lined system are metal-free. The polarographic analysis of the polycarbonate produced without any further purification shows a nickel content of only about 2 p.p.m. A polycarbonate composition prepared under similar conditions using a nickel reactor has a nickel content of from about 10 p.p.m. to about 15 p.p.m.

A total number of 17 runs using a glass lined reactor and 29 runs using the nickel reactor were made and the resulting resins were extruded and pelletized. The pellets are then injection molded at 600° F. and a 30 second cycle to obtain discs having a diameter of about 2 inches and a thickness of about ⅛ inch. The discs are then examined for color quality. Standard Color Eye procedure is used to determine color at both 400 millimicrons (degree of yellow) and 700 millimicrons (degree of greyness). The following results are noted:

| | Nickel reactor | Glass lined reactor |
|---|---|---|
| Number of runs | 29 | 1 |
| Color reflectance (percent) at 400 millimicrons average | 54.2 | 63.7 |
| Sigma (standard deviation) | 8.6 | 3.3 |
| Color reflectance (percent) at 700 millimicrons average | 79.4 | 83.0 |
| Sigma (standard deviation) | 3.2 | 1.6 |

The increased reflectance at 400 millimicrons for the runs made in the glass lined reactor shows a marked decrease in yellowness, while the increased reflectance at 700 millimicrons shows a slight decrease in grey coloration.

The above data was compared by a standard method of statistical data analysis with the use of the "Student's '$t$'" test as described in "Introduction of Statistical Analysis" by Dixon and Massey, II Edition. This mathematical analysis of the data indicated that the difference in color between the products prepared in the glass reactor and in the nickel reactor is statistically significant.

EXAMPLE 4

The reaction of Bisphenol A with phosgene is carried out exactly as described in Example 1 except that the reactor is made from nickel.

After the completion of the phosgenation step, the content of the reactor is dropped into an intensive mixing device (Baker-Perkins Sigma blade mixer) and about 2 parts of triethyl amine catalyst are added. After a period of about 20 minutes a thick viscous dough forms which separates from an aqueous layer.

The aqueous layer is decanted and the dough washed several times with about a 2% NaOH solution which is decanted after each wash cycle.

The dough is then washed once with deionized water which is decanted after about a 5 minute wash. The semi-washed dough is then divided into two equal parts, A and B.

Part A is washed several times with about 1% phosphoric acid followed by numerous water washes until the overflow water is substantially free of ionic impurities, as determined by the conductivity of the wash water.

The dough is dried and the polycarbonate obtained is molded into color discs as in Example 3 and the color as well as the color stability is determined. The transmission at 400 millimicron is 56%, the transmission at 700 millimicron is 78%. The color stability rating is E.

The second portion of the dough, Part B, is handled exactly as Part A except that the first acid wash with the 1% phosphoric acid is followed by treatment with a chelating agent, preferably in the form of a wash which contains about 150 parts of disodium ethylene diamine tetraacetic acid as a chelating agent in about 5 gallons of water.

The chelating wash is carried out for about 15 minutes to permit metal complexes to form which are thereafter removed by washing the dough several times with phosphoric acid. Treatment of the product is then completed as set forth in Part A.

The molded polycarbonate has a 400 millimicron color of 65.2%, a 700 millimicron color of 83.2% and a color stability of A to B.

In a preferred embodiment of this invention, the polycarbonate being treated with the chelating agent is in the form of a diluted dough. For example, the dough described in Example 4 is dissolved in methylene chloride at any suitable concentration, but preferably about a 10% concentration, and then treated as described for part B of Example 4. The polycarbonate is then recovered from solution form by any of the known processes such as described, for example, in U.S. Patent 3,022,271 or by precipitation and decantation and the like to obtain a product having a color stability of A to B exactly as described for part B of Example 4. It is to be understood that although the chelation process may be carried out in any other manner as desired, it is preferred to use a wash of the chelating agent in order to give the metal complexes sufficient opportunity to form.

It is noted here that in addition to those sources of metallic impurities already discussed, there are also several other sources from which metallic impurities in the polycarbonate product may be derived. For example, the use of equipment which just cannot be made from glass-lined components including, for example, sigma mixers, piston pumps, centrifugal liquid/liquid separators and the like is a source of contamination which may even cause gross amounts of contamination in the polycarbonate product. In such cases, equipment built of stainless steel, for example, which is the most commonly employed, would yield not only iron contamination, but also nickel and chromium contamination. Hence, the process of this invention becomes especially significant in ridding the polycarbonate product of several types of metal contamination at one time, preferably by the chelating embodiment, although any combination of embodiments mentioned or any other embodiment will also be effective to remove the contamination.

It is evident from the foregoing that the color stability as well as the initial color quality of a polycarbonate is improved by controlling the contamination contained therein. Generally speaking, therefore, the present invention provides a method for improving the color and color stability of a polycarbonate composition which comprises controlling the metal impurities (such as nickel, copper, iron or compositions containing these metals) so as to provide a final product containing critical amounts of said impurities.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A polycarbonate containing a nickel contaminant and having improved color characteristics wherein the nickel contaminant is present at a concentration of from about 2 to about 6 parts per million based on the total weight of the polycarbonate composition.

2. The polycarbonate of claim 1 prepared from substantially nickel free reactants in a glass lined reactor substantially free of exposed nickel surfaces capable of contacting the polycarbonate reactants to form a final polycarbonate product having a nickel contamination of from about 2 to about 6 parts per million.

3. The polycarbonate of claim 2 wherein the product is treated with a chelating agent to form a metal complex and thereafter the metal complex is washed away to yield a final polycarbonate product having a nickel contamination of from about 2 to about 6 parts per million.

4. The polycarbonate of claim 2 wherein a further quantity of polycarbonate which is free of nickel contamination is added to the product to thereby further reduce the quantity of nickel contamination in the polycarbonate product to from about 2 to about 6 parts per million.

5. The polycarbonate of claim 1 prepared by treating a polycarbonate with a chelating agent to control the nickel containing contamination therein to a final concentration of from about 2 to about 6 parts per million.

6. The polycarbonate of claim 1 prepared by adding to a contaminated polycarbonate a further amount of polycarbonate free of nickel contamination to form a final product having a nickel contamination of from about 2 to about 6 parts per million.

References Cited

UNITED STATES PATENTS

| 2,921,057 | 1/1960 | Mertzweiller | 260—93.7 |
| 3,125,560 | 3/1964 | Rose | 260—93.7 |
| 3,133,044 | 5/1964 | Allen et al. | 260—47 |
| 3,213,060 | 10/1965 | Jackson et al. | 260—47 |
| 3,214,489 | 10/1965 | Park | 260—47 |

SAMUEL H. BLECH, Primary Examiner

U.S. Cl. X.R.

260—37, 77.5, 96